(12) United States Patent
Wasiewicz et al.

(10) Patent No.: US 7,522,095 B1
(45) Date of Patent: Apr. 21, 2009

(54) POLYGONAL CYLINDER ARRAY ANTENNA

(75) Inventors: Richard Wasiewicz, Tully, NY (US); Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 274 days.

(21) Appl. No.: 11/443,815

(22) Filed: May 31, 2006

Related U.S. Application Data

(60) Provisional application No. 60/699,621, filed on Jul. 15, 2005.

(51) Int. Cl.
  G01S 13/52 (2006.01)
  G01S 5/02 (2006.01)
  H01Q 3/00 (2006.01)
  H01Q 1/28 (2006.01)
  H01Q 21/00 (2006.01)

(52) U.S. Cl. ............... 342/160; 342/368; 342/371; 342/423; 343/705; 343/706; 343/893

(58) Field of Classification Search .......... 343/700 MS, 343/705, 706, 708, 893; 342/368, 371, 160, 342/422, 423, 428
  See application file for complete search history.

(56) References Cited

U.S. PATENT DOCUMENTS

| | | | | |
|---|---|---|---|---|
| 3,474,446 A | * | 10/1969 | Shestag et al. | 342/372 |
| 3,531,803 A | * | 9/1970 | Hudspeth et al. | 342/356 |
| 3,560,975 A | * | 2/1971 | Manuali | 342/356 |
| 3,699,574 A | * | 10/1972 | O'Hara et al. | 342/154 |
| 3,839,720 A | * | 10/1974 | Reindel | 342/373 |
| 4,612,543 A | * | 9/1986 | DeVries | 342/187 |
| 4,899,162 A | * | 2/1990 | Bayetto et al. | 343/700 MS |
| 4,980,692 A | * | 12/1990 | Rudish et al. | 343/700 MS |
| 5,034,751 A | | 7/1991 | Miller, Jr. | |
| 5,220,330 A | * | 6/1993 | Salvail et al. | 342/62 |
| 5,256,988 A | | 10/1993 | Izadian | |
| 5,561,434 A | * | 10/1996 | Yamazaki | 343/700 MS |

(Continued)

OTHER PUBLICATIONS

Optimization of subarray amplitude tapers□□Haupt, R.;□□Antennas and Propagation Society International Symposium, 1995. AP-S. Digest□□vol. 4, Jun. 18-23, 1995 pp. 1830-1833 vol. 4.*

(Continued)

*Primary Examiner*—Thomas H Tarcza
*Assistant Examiner*—Peter M Bythrow
(74) *Attorney, Agent, or Firm*—Howard IP Law Group, PC

(57) ABSTRACT

A polygonal cylindrically shaped phased array antenna forming a radar has an active aperture that focuses in any of one or more angular azimuth directions without inertia. It further includes adjacent multiple similar polygonal staves joined along their vertical edges to form a right regular polygonal cylinder. Each stave is further decomposed into flat panels, wherein each panel has a plurality of antenna elements positioned in a regular rectangular or triangular lattice. Each panel contains a beam forming network that electronically forms and steers an electromagnetic beam for purposes of transmission and subsequent reception. The panels optionally may operate as autonomous radars which when coherently combined form multiple larger antenna apertures, each capable of operating autonomously. A switching network allows transmit power and all requisite radar and control signals to be sent to and received from a selected set of panels anywhere on the polygonal cylinder.

59 Claims, 12 Drawing Sheets

U.S. PATENT DOCUMENTS

| | | | |
|---|---|---|---|
| 5,565,879 A * | 10/1996 | Lamensdorf | 343/781 R |
| 5,641,135 A * | 6/1997 | Stuart et al. | 244/172.6 |
| 5,755,400 A * | 5/1998 | Kalms, III | 244/3.17 |
| 5,995,062 A * | 11/1999 | Denney et al. | 343/853 |
| 6,218,988 B1 | 4/2001 | Maruta | |
| 6,268,828 B1 * | 7/2001 | Martek | 342/373 |
| 6,407,711 B1 * | 6/2002 | Bonebright et al. | 343/705 |
| 6,514,249 B1 | 2/2003 | Maguire et al. | |
| 6,547,788 B1 | 4/2003 | Maguire et al. | |
| 6,606,057 B2 | 8/2003 | Chiang et al. | |
| 6,752,805 B2 | 6/2004 | Maguire et al. | |
| 6,768,456 B1 * | 7/2004 | Lalezari et al. | 342/373 |
| 6,771,218 B1 * | 8/2004 | Lalezari et al. | 342/373 |
| 6,774,848 B2 * | 8/2004 | Wright | 343/700 MS |
| 6,784,838 B2 * | 8/2004 | Howell | 342/377 |
| 6,842,157 B2 | 1/2005 | Phelan et al. | |
| 6,864,852 B2 | 3/2005 | Chiang et al. | |
| 6,869,431 B2 | 3/2005 | Maguire et al. | |
| 6,879,291 B2 * | 4/2005 | Duxbury et al. | 343/700 MS |
| 6,891,712 B2 | 5/2005 | Torr et al. | |
| 7,248,210 B2 * | 7/2007 | Bruce et al. | 342/175 |
| 2003/0052828 A1 * | 3/2003 | Scherzer et al. | 343/700 MS |
| 2003/0076274 A1 | 4/2003 | Phelan et al. | |
| 2004/0174303 A1 * | 9/2004 | Duxbury et al. | 343/700 MS |
| 2004/0196813 A1 * | 10/2004 | Oftek et al. | 370/334 |
| 2004/0196834 A1 * | 10/2004 | Ofek et al. | 370/352 |
| 2005/0083245 A1 | 4/2005 | Yukl | 343/909 |
| 2007/0257858 A1 * | 11/2007 | Liu | 343/893 |
| 2008/0007471 A1 * | 1/2008 | Goldberg et al. | 343/705 |

OTHER PUBLICATIONS

Phased array beam spoiling technique Kinsey, R.; Antennas and Propagation Society International Symposium, 1997. IEEE 1997 Digest Wolume 2, Jul. 13-18, 1997 pp. 698-701 vol. 2.*

* cited by examiner

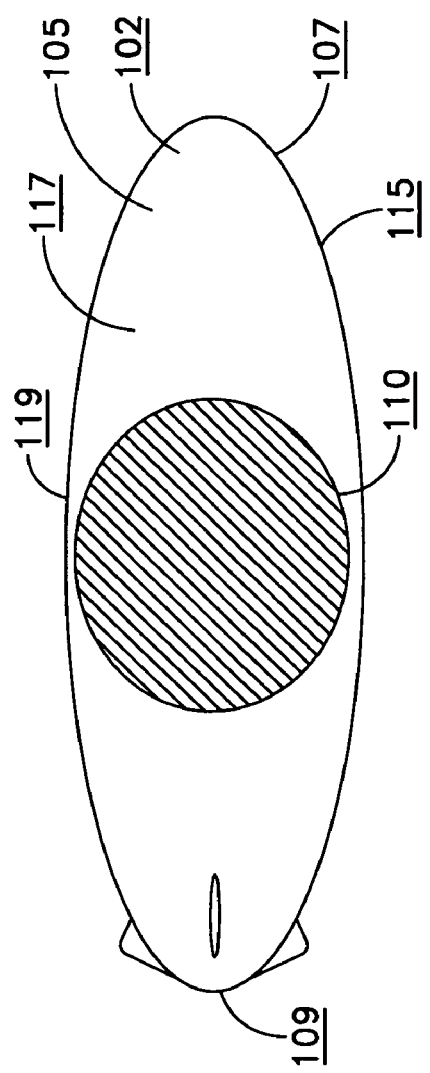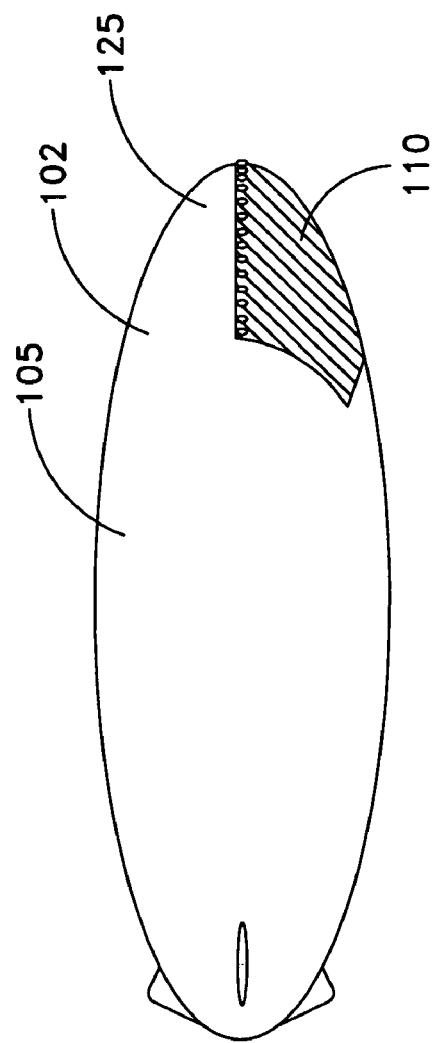
FIG. 1a
FIG. 1b

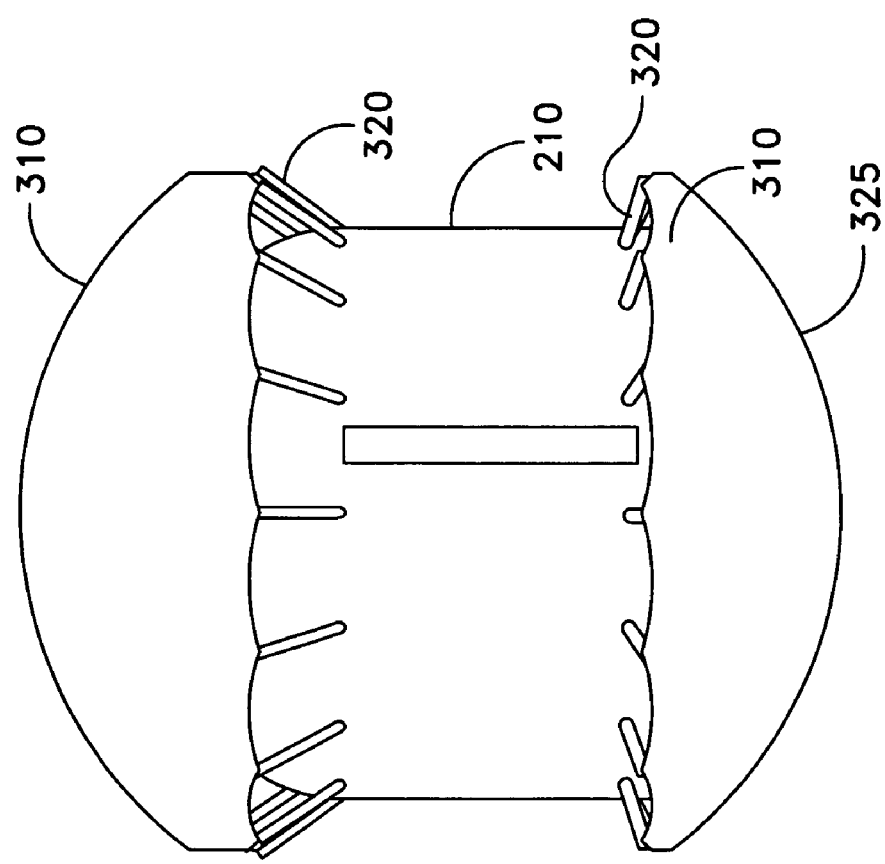

POLYGONAL CYLINDER ARRAY ANTENNA

RELATED APPLICATION

This application claims priority to U.S. Provisional Application No. 60/699,621, filed Jul. 15, 2005, the subject matter thereof incorporated by reference herein in its entirety.

FIELD OF THE INVENTION

This application relates generally to radar systems, and more particularly to cylindrical phased array radar antennas useful for airborne applications.

BACKGROUND OF THE INVENTION

In both military and civilian terrain mapping and object tracking there exists a need to enable coverage of an earth-fixed azimuth sector from high-altitude airships whose orientation continuously changes. The high-altitude airships are generally gas filled dirigibles or blimps that have shapes designed for maximizing their aerodynamic performance such as lift, maneuverability and stationary or forward movements. The airship's distinctive skin materials and craft shape often challenge equipment designers in their efforts to effectively mount information gathering instrumentation, such as radar systems. Still, high-altitude airships are receiving increased attention for use as radar sensor platforms because of the inherent capability of an unobstructed view of large segments of the earth's surface as well the large volume of available space within and/or around the airship.

Information gathering missions tend to require radar coverage over a broad azimuth sector that is fixed with respect to the earth's surface. However, various factors such as the airship's need to face into the wind, the variable direction of high altitude winds, and the airship's need to maintain a minimum airspeed for waste heat convection, forces airship orientation to constantly change with respect to the desired coverage sector. These factors require radar systems that can adapt to the changing attitudes in pitch, elevation, yaw and roll movements.

As a result, such high altitude airship radar sensors should not only be capable of providing coverage over the desired sector width, but should also be capable of continually reorienting the position of this sector coverage with respect to the airship. Consequently, radar orientation with respect to the airship provides few satisfactory options.

One option illustrated in FIG. 1a is to mount a planar phased-array radar flat antenna 110 inside an airship 102, such that it maintains coverage in a fixed direction by slowly rotating with respect to the airship as the airship orientation changes with respect to the earth. In this configuration, array normal is approximately centered in the desired coverage sector. Electronic steering is then used to position the beam within the sector. Such an internal planar phased array as shown in FIG. 1a provides a beam output that is restricted to about sixty degrees (60°) relative to array normal. Disadvantages associated with such an approach include the undesirable requirements for heavy mechanical components, including a rotary joint and coupler that are incompatible with lightweight airship applications. Furthermore, such a solution would require an increased propulsion power to compensate for a rotating radar antenna's angular momentum. Still further, the aforementioned planar phased array cannot provide instantaneous coverage over 360°. Moreover, such a solution would suffer significant beamsteering gain loss (e.g. >9 dB) near coverage limits, thus, severely compromising overall operational performance.

Another option illustrated in FIG. 1b is to install a non-planar radar antenna phased array 110 on an airship's doubly-curved surface as opposed to internally to airship 102 (see FIG. 1a), such that the phased-array conforms to a large fraction of the airship's outer surface 105. In such a surface-conformal phased array radar system, a portion of the array whose normal approximately matches the center of the desired coverage sector is activated and then used to form and electronically position the beam within the desired sector. Numerous problems exist with this approach as well.

As is known in the art, a collimated beam of radio frequency energy may be formed and steered by controlling the phase of the energy radiated from each one of a plurality of antenna elements in an array thereof. A portion of the array whose normal approximately matches the center of the coverage sector might then be activated and used to form and electronically position the beam within a geographic sector.

For example, the curvature of surface 105 varies as a function of position on the airship surface (which is made larger or smaller due to gas expansion and contraction) so that antenna radiator element-to-element separations must also change as a function of position in order to maintain conformality. In addition, non-uniform element-to-element separations degrade the shape, gain, and sidelobes of the electronically scanned beam. Furthermore, range coverage and azimuth beamwidth are non-uniform in azimuth, as the projected aperture changes significantly as a function of azimuth. Accurate beamforming and shaping is therefore difficult because the airship surface expands and contracts significantly due to air density and temperature variations and tends to undulate or flutter due to airflow.

Still further, manufacturing and construction costs associated with the above approaches are high, due at least in part because the variable surface curvature requires the sub-panels constituting the array be of many different shapes and designs, creating adherence problems analogous to the well publicized space shuttle tiling problem.

Time-varying aperture shape associated with the conformal array approach also causes pulse-to-pulse variations that limit clutter cancellation. Other problems associated with the aforementioned approaches include complicated power and signal distribution, as different parts of the array may be hundreds of meters apart. Changing airship shapes also make calibration difficult, particularly with regard to the difficulty or inability to inject test signals into the antenna elements in the above surface-conformal approach.

An alternative mechanism for a radar system useful in a vessel such as a high altitude airship, and which overcomes one or more of the above-identified problems, is highly desired.

SUMMARY OF THE INVENTION

According to an aspect of the present invention, a radar antenna in the form of a right regular polygonal cylinder has multiple generally flat rectangular panels, each capable of operating as an autonomous electronically scanned radar, and each capable of independently forming, steering, and shaping transmit and receive beams. The flat rectangular panels are joined along vertical edges and tangent to a virtual right circular cylinder such that the panels form a right polygonal cylinder having M panels along the circumference of the cylinder and N panels along the axis of the cylinder, where M is an integer greater than or equal to three and N is an integer greater than or equal to one. A signal switching distribution network allows transmit power and requisite radar and control signals to be sent to and received from selected subsets of the panels. A processor coherently combines the outputs of the selected subsets of the panels to provide an output signal indicative of the requested coverage area.

According to another aspect of the present invention, a polygonal cylindrically shaped antenna radar array has an active aperture that focuses in one or more angular azimuth directions without inertia. The array further includes M (M≧3) adjacent, flat rectangular staves of like shape and joined to form a right regular polygonal cylinder. Each of the M staves is further decomposed into N (N≧) identical flat rectangular panels joined along their horizontal edges wherein each panel includes a plurality of antenna elements positioned in rectangular, triangular or hexagonal tessellation of the plane or lattice. Each panel contains a beam forming network that electronically forms and steers an electromagnetic beam for purposes of transmission and subsequent reception. The panels optionally may operate as autonomous radars or coherently, which when electronically combined form multiple larger antenna apertures, each capable of operating autonomously. A switching network allows transmit power and all requisite radar and control signals to be sent to and received from a selected set of panels anywhere on the polygonal cylinder.

BRIEF DESCRIPTION OF THE DRAWINGS

The invention is best understood from the following detailed description when read in connection with the accompanying drawing. The various features of the drawings are not specified exhaustively. On the contrary, the various features may be arbitrarily expanded or reduced for clarity. Included in the drawing are the following figures:

FIG. 1a illustrates mounting a trainable planar phased-array radar antenna internal to an airship.

FIG. 1b illustrates the conformal mounting of a phased-array radar antenna on the doubly-curved surface of an airship.

FIG. 3 illustrates a polygonal cylindrical antenna array mounted on the surface of and supported by an inflatable pressure vessel in accordance with an exemplary embodiment of the present invention.

DETAILED DESCRIPTION OF THE INVENTION

Figure 2A:
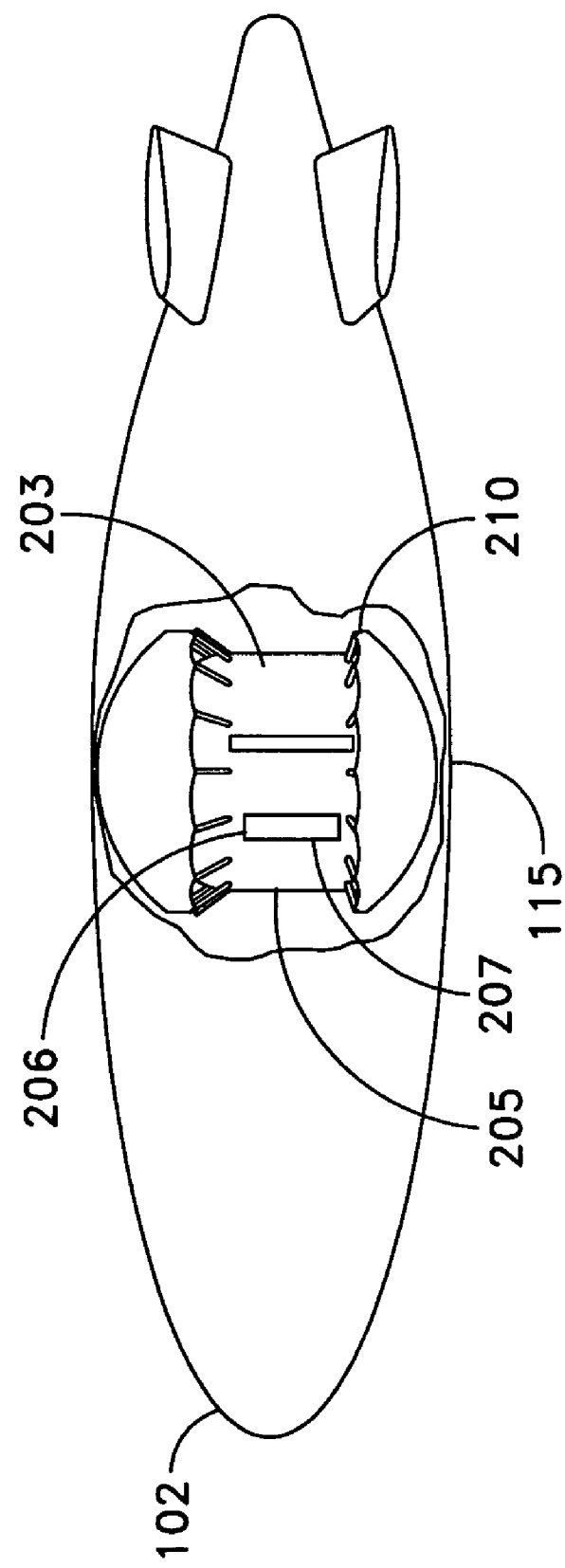
FIG. 2a illustrates mounting a polygonal cylindrical antenna array internal to the airship in accordance with an exemplary embodiment of the present invention.

In the figures to be discussed, the circuits and associated blocks and arrows represent functions of the process according to the present invention which may be implemented as electrical circuits and associated wires or data busses, which transport electrical signals. Alternatively, one or more associated arrows may represent communication (e.g., data flow) between software routines, particularly when the present method or apparatus of the present invention is a digital process. In the embodiments of the invention disclosed herein, the airships are gas filled dirigibles, however, the invention as disclosed is not limited in its application to dirigibles, but may be employed in other types of aircraft, satellites or stationary ground radar systems.

As previously discussed with regard to FIG. 1a and FIG. 1b, an airship 102 surface curvature 117 changes continuously over an entire surface 115, and an antenna array 110 on such a doubly-curved surface must continuously change its antenna radiating element-to-element spacings to maintain conformality. Variable element 119 spacings and changing surface curvature 117 also degrade the quality of the electronically formed beam and corresponding sidelobe structure. Radars mounted as illustrated in FIG. 1b typically produce non-uniform azimuth beamwidth coverage, with the changing surface curvature 117 being particularly severe near the nose 107 or tail 109 of the vessel. Manufacturing and construction costs for the above designs are high because the variable surface curvature 117 requires that the sub-panels 119 constituting the conformal array be different shapes and designs. Air pressure variations due to changes in air density and/or temperature also cause the (non-rigid) airship outer surface to change shape as the airship 102 expands and contracts. Air flowing past the surface 115 also induces localized shape changes, essentially causing the surface 115 to undulate or flutter. Each of these variables contributes to making it virtually impossible to perform accurate beamforming. Additionally, an unpredictable varying surface shape 117 whose variations change as a function of time also induces pulse-to-pulse errors that limit the radar's ability to cancel severe mainlobe surface clutter. Power and signal distribution is also a problem, particularly for an airship-surface-conformal array, due to the severe spacing (e.g., hundreds of meters apart) between different parts of the array.

Referring now to FIG. 2a, there is shown a schematic representation of a polygonal cylinder array 210 according to an exemplary embodiment of the present invention. Antenna 210 may be mounted either internal to the airship 102 (as shown in FIG. 2a) or beneath or above its exterior surface 115 or hull, and provides virtually instantaneous scan capability over a full 360° azimuth without inertia and without scan loss. Such mounting avoids problems associated with the surface-conformal array's shape change, since the polygonal cylinder array 210 structure is independent of the airship surface 115. The decoupling from the airship 102 surface 115 and decomposition of antenna panel 206 elements into flat vertical staves 207 simplifies electronic calibration, as the ability to inject test signals into the antenna elements is not impeded by changing physical relationships. Furthermore, such a configuration provides for complete modular maintenance, replacement and repair of the antenna and radar components at the line or depot repair level.

FIG. 2a shows the airship 102 having a hull in which is housed polygonal cylindrical antenna array 210 comprising a right cylinder 203 having mounted upon its outer surface 205 antenna element panels 206 arranged in columns of staves 207. The panels 206 may be formed from various shapes such as a triangle, hexagon or rectangle, however, each panel's outer surface is flat and perpendicular to the axis of the right cylinder. The panels 206 as mounted form the polygonal structure of the cylindrical antenna array 210. It will be recognized by those skilled in the pertinent arts that the location and manner of mounting the cylindrical antenna array 210 will depend on various factors, including the design and choice of the particular application (e.g. particular vessel or airship), and other design choices including weight, balance, and performance of the radar system to meet its intended objectives, for example.

Figures 2B, 2C:
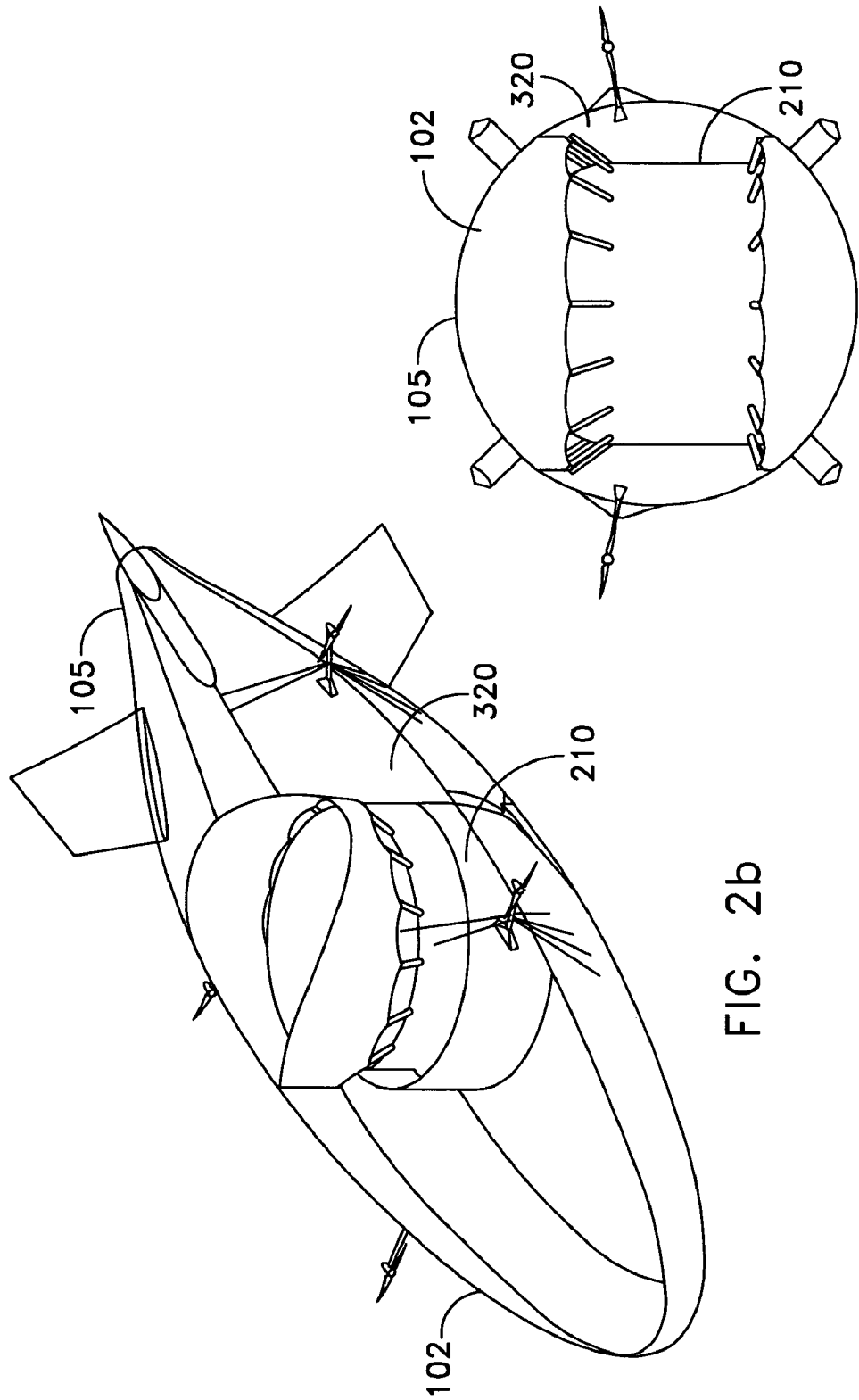
FIG. 2b illustrates a cut-away view of a polygonal cylindrical antenna array mounted within an airship in accordance with an exemplary embodiment of the present invention.
FIG. 2c illustrates a cut-away end view of a polygonal cylindrical antenna array mounted within airship in accordance with an exemplary embodiment of the present invention.

FIG. 2b illustrates a cut-away view of the polygonal cylindrical antenna array 210 mounted within an airship 102. The cylindrical antenna array 210 is shown mounted through support members 320. FIG. 2b illustrates a cut-away end view of antenna array 210 mounted within the airship 102. In this embodiment of the invention, the supported support members 320 that attach the outer housing of the cylindrical antenna array 210, also attach to the inner structure of the airship 102.

FIG. 3 illustrates cut-a-way view of the polygonal cylindrical antenna array 210 mounted on the outer surface of an inflatable pressure vessel 310 whose purpose is to keep the antenna rigid with minimum weight. The pressure vessel and antenna are then mounted inside the airship 102. The antenna array 210 and pressure vessel 310 are supported by support members 320 that attach the outer surface or housing of the pressure-vessel-mounted cylindrical antenna array 210, which contains electronic processing circuitry and power systems 325, to the structure of the inflatable pressure vessel 310. The inflatable pressure vessel provides lift to the airship 102, but its primary purpose is to provide a lightweight and rigid support for the cylindrical array 210. In fact through additional partial inflation pressures over the interior pressure of airship the novel configuration of the rigid cylinder shape achieves a relatively lightweight formation. In addition the antenna cylinder shape is highly scalable in terms of radar frequency, cylinder height, cylinder diameter, panel size, number of staves, and number of rows.

The antenna array 210 and supporting electronics may be jointly or separately mounted internally or beneath the airship to permit the radar coverage sector to be instantaneously repositioned to any desired azimuth, thus maintaining coverage of an earth-fixed azimuth sector as the airship changes its orientation with respect to the earth. The invention can also be used as a ground-based radar, independent of its airship application, where instantaneous inertial-less 360° azimuth coverage is desirable.

Figure 4:
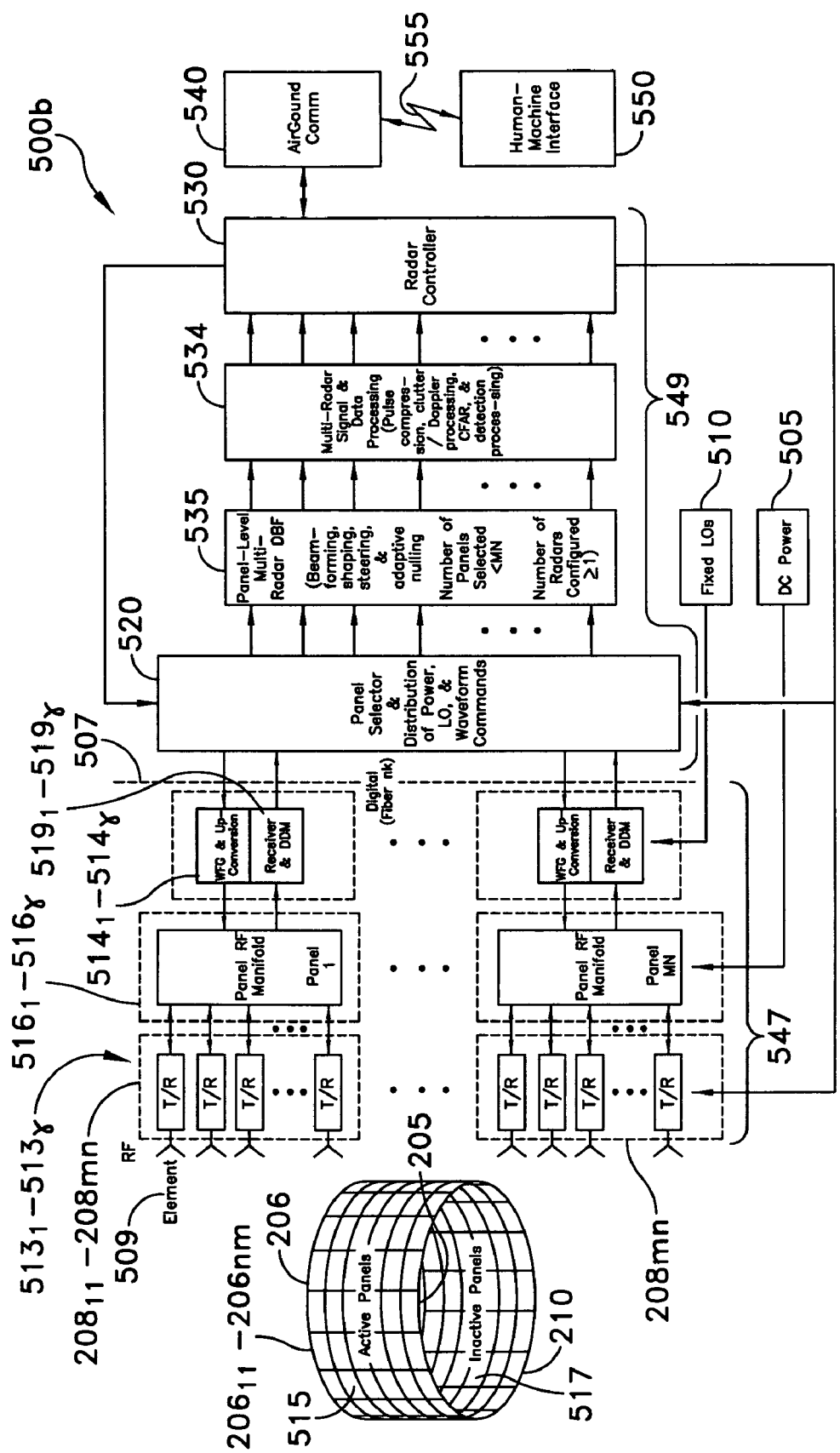
FIG. 4 is a functional block diagram of a phased-array radar based on the polygonal cylinder antenna in accordance with an exemplary embodiment of the present invention.

FIG. 4 shows a functional block diagram of a cylindrical polygonal antenna array 500a and an electronic radar processing system 500b for controlling and processing signals to/from the antenna array according to an exemplary embodiment of the present invention. The processing system includes an analog beamforming portion and a digital beamforming portion, in accordance with an embodiment of the present invention. Each panel $206_{11}$-$206_{mn}$ of the antenna 210 has a corresponding set of transmit-receive subsystems ("T/R subsystems") $208_{11}$-$208_{nm}$. Each set of transmit-receive subsystems ("T/R subsystems") $208_{11}$-$208_{nm}$ comprises individual T/R modules a $513_1$-$513_r$, having optional phase shifters with amplitude control, generate multiple independent and simultaneous beams distributed to one of an associated panels 2061, of the entire set of panel elements $206_{11}$-$206_{nm}$. In a receive mode the T/R modules $513_1$-$513_r$, are synchronized to the previous transmissions. In one configuration, e.g., the multiple simultaneous Ground Moving Target Indicator (GMTI) radars, the multiple simultaneous transmissions emanate from separate radars or panels $206_{11}$-$206_{nm}$ on the cylinder 205. The amplitude of panel $206_{11}$-$206_{mn}$, both in transmission and reception, may be variably controlled depending on the mission and the need to improve the reliability of signal capture. Amplitude control typically is used to maintain low sidelobes on transmit and receive and in some cases is used in combination with phase control to shape the transmit beam. In another embodiment, the system 500b broadens the GMTI radar transmit beams in azimuth using phase spoiling. Each broad transmit beam is filled with multiple simultaneous and narrow receive beams to provide more time on target than would be typically be available with a single transmit-receive beam pair. Each flat rectangular panel 206 may be operated as an independent sub-radar, wherein each panel individual T/R modules a $513_1$-$513r$ has a corresponding element 509. In some cases these sub-radars are grouped and coherently combined to form multiple special-purpose radars, such as the multiple staggered rows, which serve as multiple independent GMTI radars or are coherently combined to form a single pencil-beam radar for track.

Figure 5:
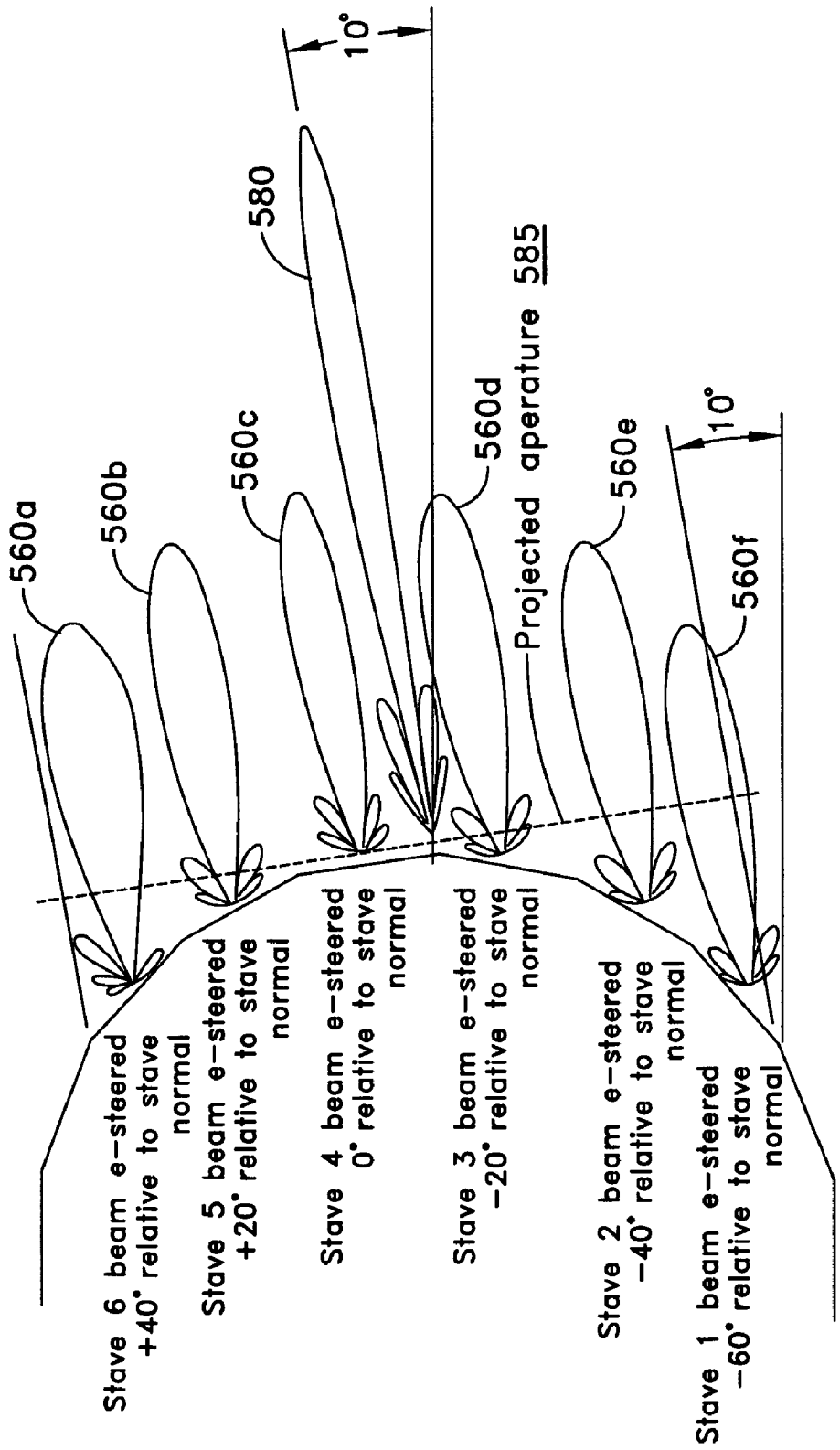
FIG. 5 illustrates a plan view of a phased-array radar antenna having staves along the circumference of the cylindrical surface.

Still referring to FIG. 4 and FIG. 5, the antenna 210 array may also optionally utilize a variety of beam shapes during operation. For example, the GMTI search radars use a non-linear phase progression across all element columns on transmit and vector or complex (amplitude and phase) weighting on receive to shape the two-way beam gain in elevation. This shaping is such that signal-to-noise ratio ("SNR") against a reference surface target at a fixed azimuth is approximately constant for any target range from the horizon into some pre-determined minimum range. The transmit beam is further broadened in azimuth by applying a non-linear phase progression across the horizontal dimension of the transmit aperture. Multiple simultaneous receive beams, each with identical elevation shape and each steered to a different azimuth then fill the broadened transmit beam. Each of the resulting simultaneous two-way beams then has the desired constant SNR property. In GMTI track, however, more panels 206 are combined and the element 206 weighting is chosen to produce a beam that is very narrow in both azimuth and elevation, as for example what is commonly referred to as a pencil beam.

FIG. 5 illustrates a plan view of a portion of the cylinder array 210 shown in FIG. 4 as an 18-stave set, having six rows. The multiple stave beams such as the six staves 560a-560f are coherently shaped and steered by element level analog beamforming, and then combined by stave-level digital beamforming to form pencil beam 580. In the illustrated example, each stave offsets 20° relative to its adjacent neighbors, 20° being characteristic of an 18-stave design. In coherently combining the multiple staves via a digital beaming system to be more fully described below, the example pencil beam 580 has been steered to 10°, the maximum electronic steering angle employed by this particular set of staves. The net beam has a higher gain than the individual stave beams 560*a*-560*f* and a narrower beamwidth consistent with the projection of the total 6-stave aperture 585 as projected in the direction of the beam 580.

The panel or stave near-field pattern of the antenna 210 is approximately a projection of the stave or shape 206 in a direction perpendicular to the plane of the panel 206. The panel beam begins to collimate and diverge at a distance approximately given by $D^2/\lambda$ were D is the aperture width in meters and $\lambda$ is the wavelength in meters. The far-field phase front is planar and subtends an angle with respect to the antenna array 210 face which is a function of the beam steering direction.

MIMO (Multiple Input Multiple Output) radar applications may also optionally be employed, where multiple sub-radars each transmit different signals, which are then received by multiple sub-radars. The outputs of these radars are combined depending upon mission assigned to the MIMO radar such as by way of example and not limitation, achieving high probability of detection or resolving targets from background or electronic countermeasures.

Again referring to FIG. 4, the cylindrical polygon array 500*a* circumscribes the outer periphery of the cylindrical surface 205 of the phased array antenna 210, panels 206 and for purposes of illustration, comprise a subset of flat active panels 515 and a subset of inactive panels 517 in accordance with one embodiment of the present invention. The panels 206 are arranged as adjacent staves in a generally square matrix around the circumference of the cylinder 203 and along the operational length of the cylinder. The number of matrix elements will be a function of the physical dimensions of the operational circumference, length of the cylinder 205 and size of the panel 206. The electronic system 500*b* may optionally adjust each antenna 210 panel element 206 amplitude and phase independent of all other elements. This "phase-phase" capability enables each of the panel 206 elements to shape and steer its beam in two dimensions. This in turn enables configuring different radars from sets of sub-radars. Panels 206 are typically broadband, but broadband is not a limitation of the basic invention in that any bandwidth falls within the scope of the invention as disclosed. With regard to beamforming, the beam created by each flat rectangular panel 206 can be individually shaped in azimuth and elevation for very low sidelobes. When the beams from multiple panels 206 are coherently combined by digital beamforming the net beam reliably has low sidelobes. This is in contrast to pure cylinder arrays, which suffer from sidelobe blooming where cylinder curvature blocks some elements from view at wide scan angles so the sidelobes at these angles increase dramatically. In addition, the use of flat panels 206 greatly simplifies and improves calibration, sidelobe control, and beam-pointing accuracy. It also reduces SNR loss at the peak of the beam.

As further illustrated in FIG. 4, the system 500*b* receives an RF signal from panel 206 having elements 509, which are digitized and later combined. Depending upon the radar frequency, it may be desirable to decompose each panel 206 into sub-panels, each with its own manifold. Each sub-panel would then have its own manifold and transceiver (transmitter and receiver), such that the transceiver outputs would be in-phase (I) and quadrature-phase (Q) signals. More specifically, the phased array antenna array 210 receives RF energy forming a desired beam pattern by imparting a prescribed amplitude-phase distribution over the wave field emanating from its aperture or panels 206, each containing a radiating element 509. An analog portion 547 of system 500 comprises a plurality of a T/R modules $513_1$-$513_r$, a plurality of panel RF manifolds $516_1$-$516_r$, (one manifold per panel or sub-panel if there are sub-panels) that feed and receive T/R modules $513_1$-$513_r$, signals, a plurality of transceivers comprising wave form generators and up conversion apparatuses $514_1$-$514_r$, that feed the panel RF manifolds $516_1$-$516_r$, and a plurality of receiver and digital demodulators $519_1$-$519_r$, that receive radar signals from the panel RF manifolds $516_1$-$516_r$.

The plurality of T/R modules $513_1$-$513_r$, amplify the transmit signals on transmission of the radar signal and amplify the received radar signal during reception. The T/R modules $513_1$-$513_r$, also serve to provide an element 509 phase and amplitude control. The panel RF manifolds $516_1$-$516_r$, receive amplified element 509 signals and feed the signals to the plurality of receiver and digital demodulators $519_1$-$519_r$. The panel RF manifolds $516_1$-$516_r$, distribute element 509 signals on transmit and coherently combine element signals on receive.

A digital portion 549 of system 500*b* comprises a digital fiber link 507 having to feed the plurality of wave form generators and up conversion apparatuses $514_1$-$514_r$, and to receive the plurality of receiver and digital demodulators $519_1$-$519_r$, radar return signals. The demodulators within the receiver and digital demodulators $519_1$-$519_r$, receive radar return signals which are mixed with a local oscillator 510 to produce a demodulated radar signal. Essentially, the receiver and digital demodulators $519_1$-$519_r$, and later associated beamforming networks electronically combine the panel 206 elements 509 to amplify the beamformer RF output and associated downconverters into digitized in-phase (I) and quadrature-phase (Q) signal that are then passed on to a signal processor.

A panel selector and distributor 520 both feeds and receives transmission signals from a fiber link 507. Fiber link 507 receives analog signals and converts the analog signals to a digital signal so as panel selector and distributor 520 receives radar return signals from the fiber link 507 for further processing. The waveform generators and up conversion apparatuses $514_1$-$514_r$, and associated downconverters digitize an in-phase (I) and quadrature-phase (Q) signal that is then passed on to the panel selector and distributor 520. The panel selector and distributor 520 receives input data from the radar controller 530 to select the panels 206 that array as a group determined by the mission. Controller 530 also inputs data directly to the T/R modules $513_1$-$513_r$, to establish the element 509 phase and gain control commands.

A subsystem 535 receives in-phase (I) and quadrature-phase (Q) signal from the panel selector 520. The subsystem 535 selects the number of panels 206 and the number of radars configured and sets up the multi-radar in-phase (I) and quadrature-phase (Q) output signals. The digital data from sub system 535 feeds a multi-radar signal and data processing system 534 to achieve proper pulse compression and to choose selected processing modes to overcome the effects of clutter or electronic countermeasures. The multi-radar signal and data processing system 534 output provides input to the radar controller 530 for among other things multi-radar detections and mapping data. Radar controller 530 also receives appropriate input from an air ground command 540, which in turn is dependent on human-machine interface 550 that allows human intelligence through an air ground link 555 to establish various mission operating parameters.

It is understood that the processor, memory and operating system with functionality selection capabilities can be implemented in hardware, software, firmware, or combinations thereof. In a preferred embodiment, the processor functionality selection, threshold processing, panel selection and mode configuration may be implemented in software stored in the memory. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the subject invention may reside in the program storage medium that constrains operation of the associated processors(s), and in the method steps that are undertaken by cooperative operation of the processor(s) on the messages within the signal and data processing network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

Figure 6B:
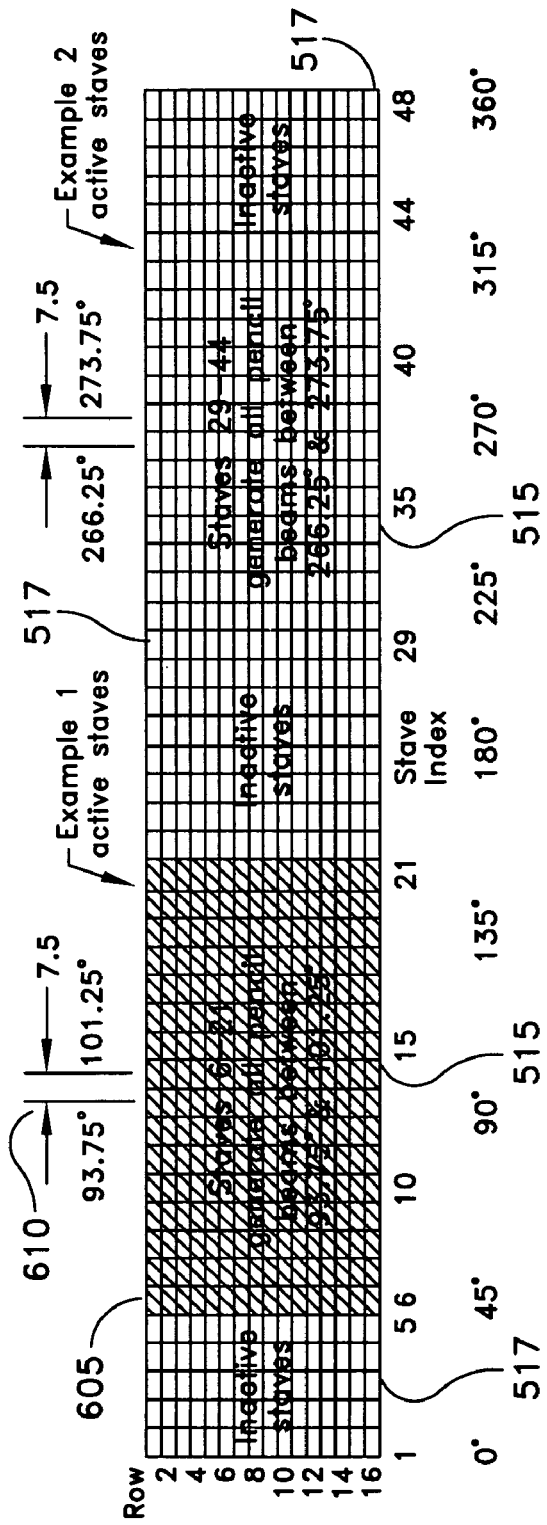
FIG. 6b illustrates a plane view of a polygonal cylindrical antenna array having sets of active and inactive staves in accordance with one embodiment of the present invention.
Figure 6A:
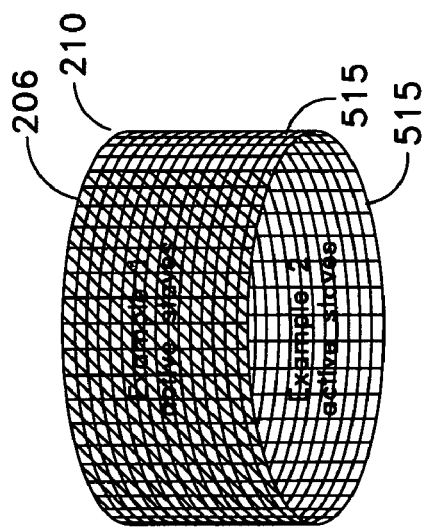
FIG. 6a illustrates a perspective view of a polygonal cylindrical antenna array having active and inactive staves in accordance with an exemplary embodiment of the present invention.

Referring now to FIG. 6a, there is shown a perspective view of the polygonal cylindrical antenna 210 array having selective sets of active staves 515 in accordance with one embodiment of the present invention. Selected sets of panels or staves means that signals and power are sent to various subsets of panels 206a-206n to form one or more active radars. As previously indicated the polygonal 205 cylinder is mounted inside or beneath the airship with the staves oriented vertically and to form a beam at a given azimuth, a subset of panels or staves 206 whose average normal is closest in azimuth to the desired beam azimuth are electronically identified. Staves 206 or sub-panels whose individual normal deviate from the desired azimuth direction by more than some pre-selected threshold angle are electronically excluded. The FIG. 5a panel selector 520 in combination with panel-level multi-radar 535 then configures the selected staves or sub-panels as a radar whose outputs are coherently combined, and if necessary, appropriate phase progressions are applied to electronically steer the net beam to the desired angle. Since the staves 206 or sub-panels are selected to point approximately in the desired direction, electronic steering need not steer the beam by more than 180/N degrees, where N is the number of staves. As the airship changes orientation with respect the desired earth-fixed azimuth to be probed, an updated set of staves 206 or sub-panels is selected whose average normal is closest in angle to the desired beam position. Electronic steering is then applied again to provide a fine beam correction to position the beam exactly at the desired azimuth. Even if the airship rotates through a full 360 degrees, the selected set of staves or sub-panels moves around the polygonal cylinder to maintain its near-normal orientation with respect to the desired beam direction. As a result, the radar beam can continually probe a given earth-fixed azimuth independent of the airship 102 orientation.

In an example of active staves dedicated to single pencil-beam radar, FIG. 6b illustrates a plane view of an antenna array 210 having sets of active staves 515 and inactive staves 517. In the exemplary embodiment shown for purposes of illustration and not limitation, the 16 rows of 48 panels 206a-206n, each arranged in 48 columns (staves) of 16 panels each, for a total 768 panels. In this example, 16 horizontally adjacent staves 605 are activated to electronically form the steered pencil beam, wherein the bulk of azimuth beamsteering is achieved by selecting a set of 16 horizontally adjacent staves 610 whose local normal is closest to the desired pencil beam azimuth. The final position of the pencil beam is achieved via electronic steering of stave set in azimuth and elevation. Note that no set of 16 staves need steer in azimuth more than 3.75° (½ of 7.5°) from its own local normal. The azimuth sector 610 is covered by staves numbered 6 through 21. When operating in a pencil beam mode the 3 dB beamwidth is given approximately by $\lambda/Dp$ where $\lambda$ is the wavelength in meters and $Dp$ is the projected width of the aperture onto a plane perpendicular to the beam steering direction. The beam will broaden from this width if aperture weighting is applied to reduce sidelobes.

Figure 7B:
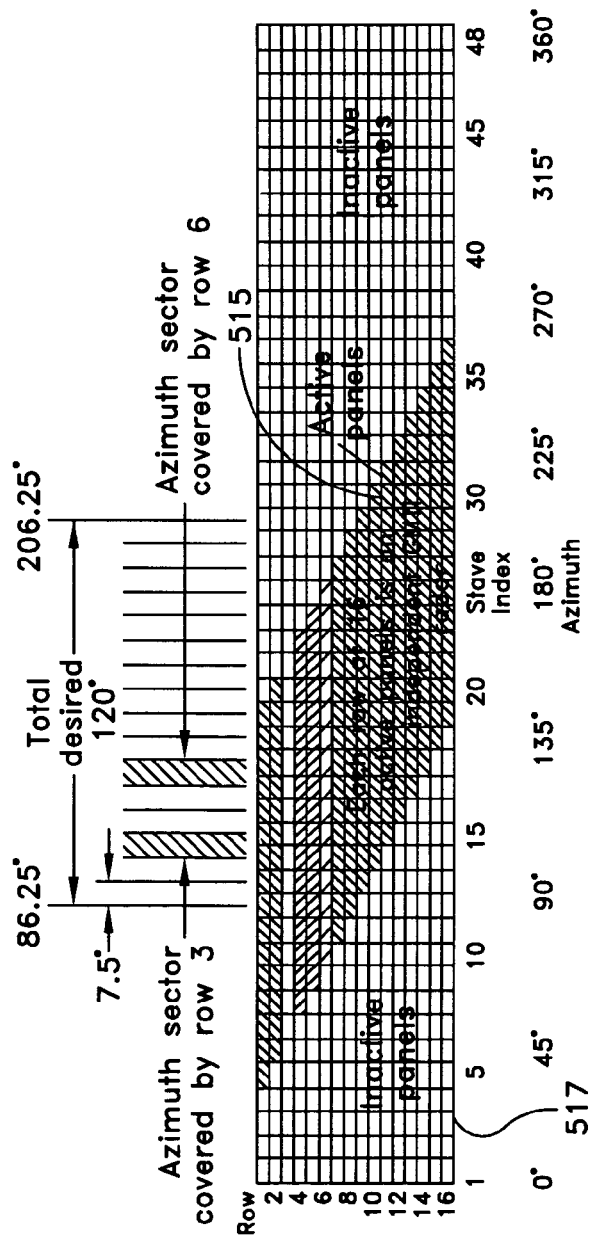
FIG. 7b illustrates a plane view of a polygonal cylindrical antenna array having sets of staggered active and inactive staves in accordance with one embodiment of the present invention.
Figure 7A:
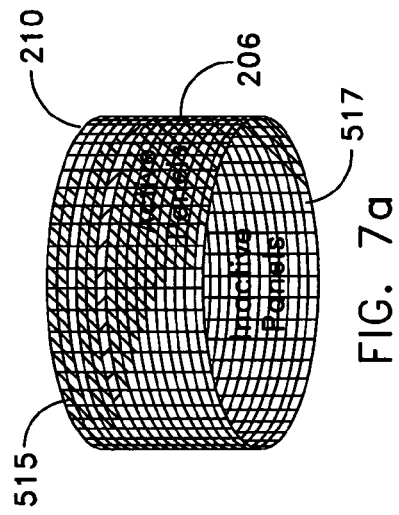
FIG. 7a illustrates a perspective view of a polygonal cylindrical antenna array having sets of staggered active and inactive staves in accordance with one embodiment of the present invention.

Referring now to FIG. 7a, there is shown a perspective view of a cylindrical antenna array 210 having sets of staggered active panels 515 and inactive panels 517 in accordance with one embodiment of the present invention. Instantaneous coverage of a broad azimuth sector does not suffer a significant gain loss as the beam is electronically steered toward the limits of the coverage sector due the ability to stagger each row of active panels 515.

FIG. 7b illustrates a plane view of the antenna array 210 having selected sets of panels which are staggered active panels 515 and inactive panels 517 in accordance with one embodiment of the present invention. The cylinder 210 has N staves and M panels 206 per stave for a total of N*M panels. Selected sets of panels means that signals and power are sent to various subsets of these N*M panels 206 to form one or more active radars. The specific selected sets of panels are chosen dependent upon the radar mission (search, track, fire control, etc.), as by way of example and not limitation, the orientation of the airship with respect to the azimuth covered, and a predetermined radar configuration for satisfying the mission. Panels that are not selected remain neither transmit nor receive. The antenna 210 optionally positions nulls in the sidelobes and mainlobes of the beam to reduce interference and jamming. The nulls in the directions of jammers will be formed adaptively on receive, while nulls in the direction of severe surface clutter are formed deterministically.

Figure 8:
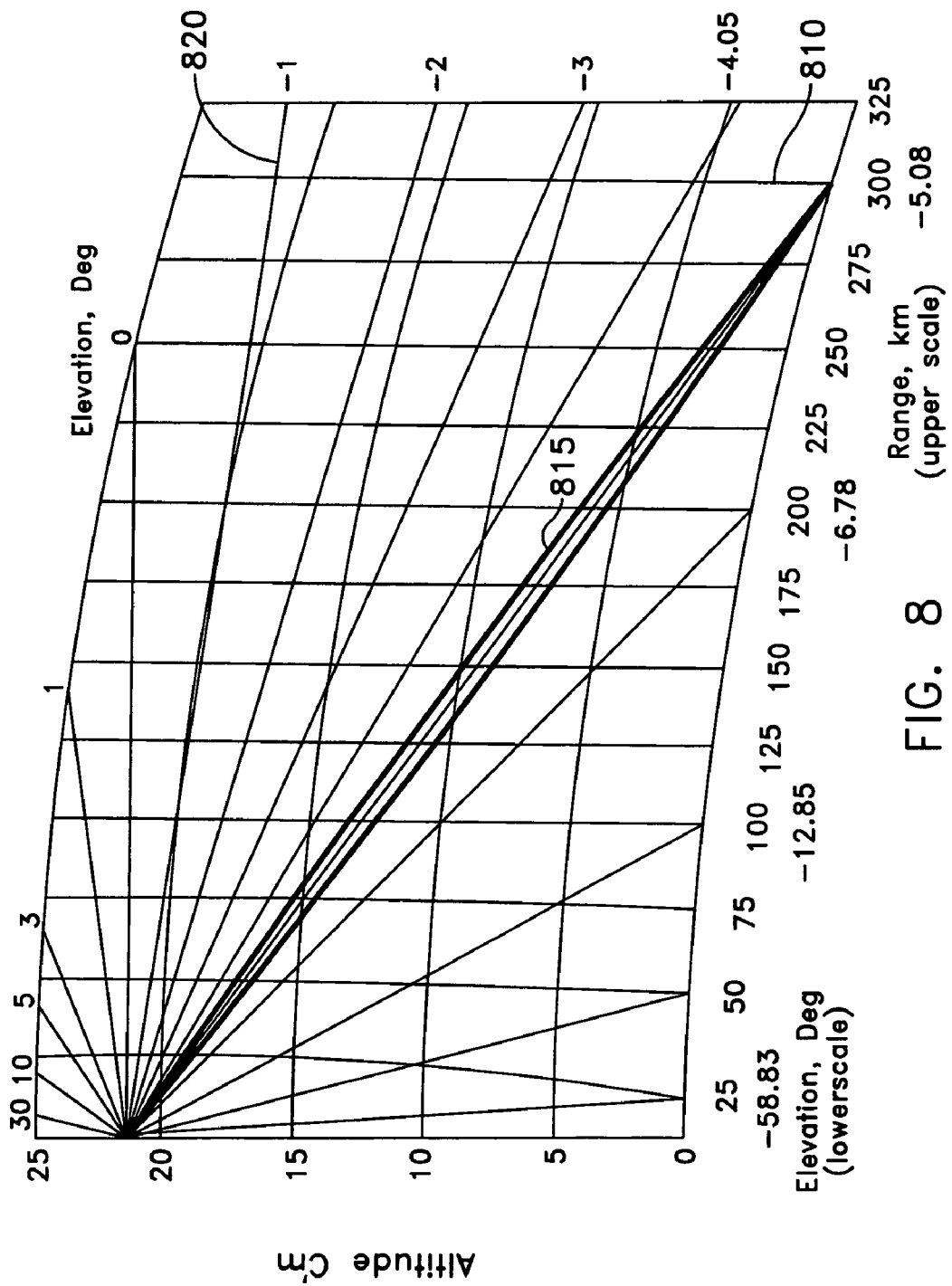
FIG. 8 is a graphical plot of constant-SNR contour against range, height, and elevation for pencil beam performance of an antenna of the present invention.

FIG. 8 is a graphical plot of constant-SNR contour against range, height, and elevation for a pencil beam performance of the antenna 210 of the present invention. The example illustrates the performance of the antenna 210 having dimensions eight (8) meters vertical height aperture arrayed in a pencil beam 815 configuration steered to −5.09° and 300 km located at an exemplar elevation of 22,000 meters above earth's surface along the ordinate and constant ground range 810 from the antenna 210 along the abscissa. From the location of the antenna 210 are indicated constant elevation angles 820 relative to the antenna 210 and contours of constant SNR that are referenced to the SNR at the horizon. In the illustrative example, shown in FIG. 8, the transmit aperture is uniformly weighted in amplitude and the receive aperture of 30 dB Taylor weights are applied to each element column.

Figure 9:
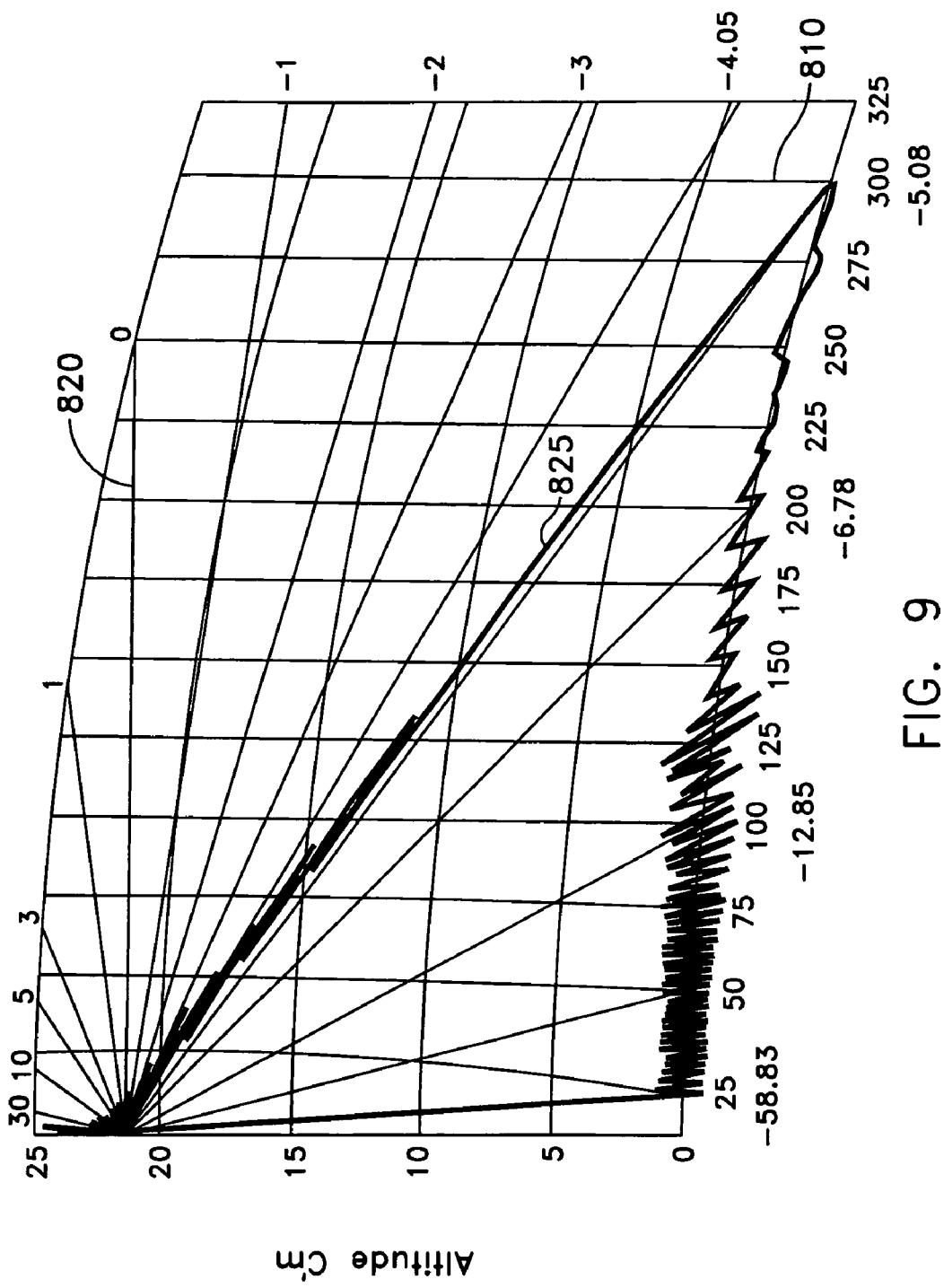
FIG. 9 is a graphical plot of constant-SNR contour against range, height, and elevation for GMTI performance of an antenna of the present invention.

FIG. 9 is a graphical plot of constant-SNR contour against range, height, and elevation for GMTI performance of an antenna of the present invention, further illustrating the antenna 210 having dimensions eight (8) meters vertical height. The result of beam shaping is plotted against contours of constant SNR 825 referenced to the SNR at the horizon. The lines 810 indicate the constant range from the antenna 210. The GMTI beam in this example is designed to maintain constant reference-target SNR along earth's surface from −5.09° (300 km) to −60° (24.6 km). In FIG. 9 the transmit aperture is again uniformly weighted in amplitude and an exponential phase tapers down columns to broaden and shape the elevation response. The receive aperture has an amplitude and phase which tapers down columns designed to shape the response, while countering deficiencies in the transmit pattern.

Figure 10:
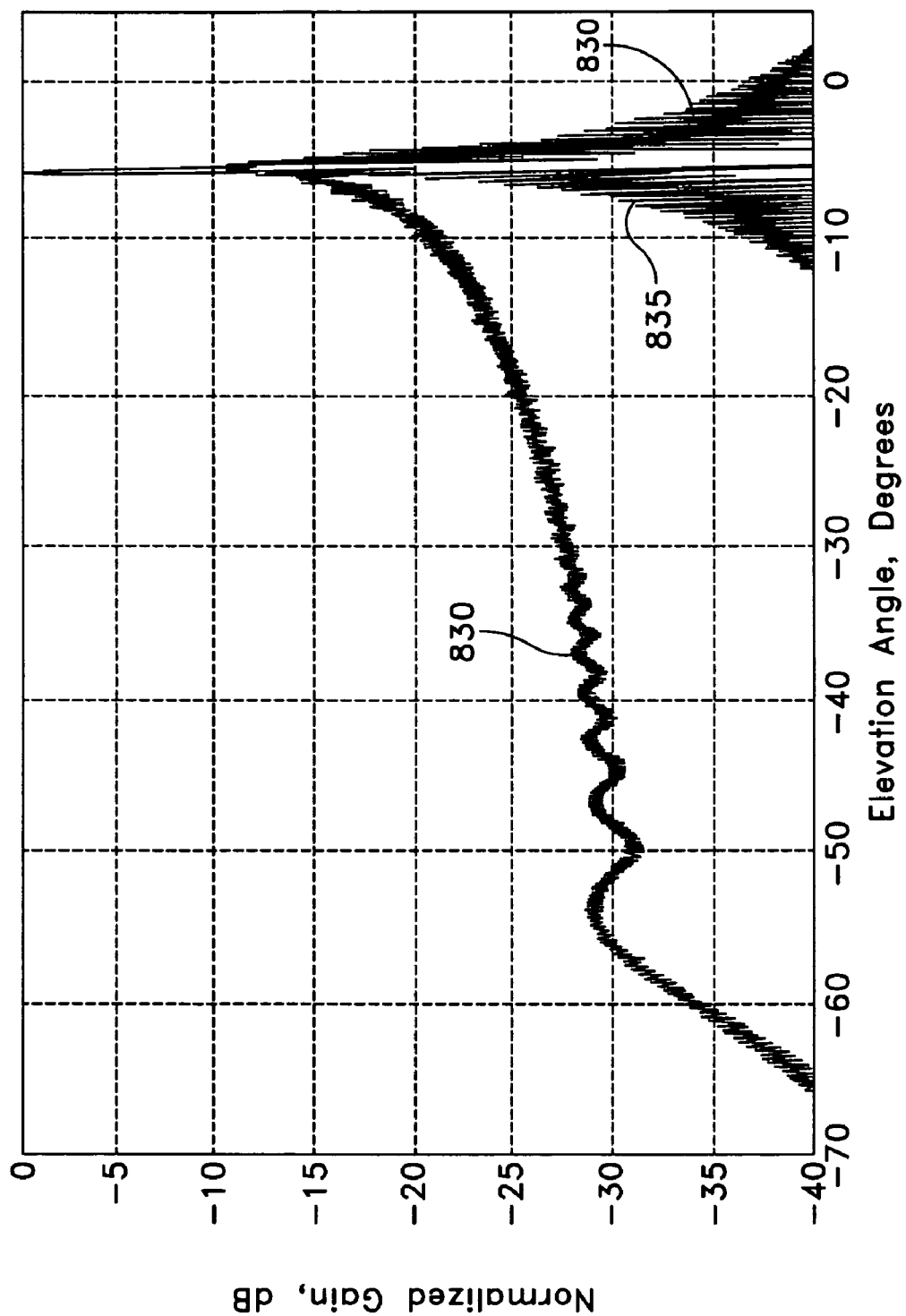
FIG. 10 is a graphical comparison of transmit beams with and without phase shaping of an antenna of the present invention.

FIG. 10 is a graphical comparison of transmit beams in the elevation plane with and without phase shaping of an antenna of the present plotted against a normalized gain along the ordinate and elevation angles along the abscissa. The line 830 shows the shaped transmit beam from the phase-weighted aperture, and the line 835 shows the transmit beam from a uniformly weighted aperture steered to −5.09° elevation. The transmit phase taper is chosen to complement the complex receive taper such that constant SNR is maintained along earth's surface from −5.09° to −60° elevation.

Figure 11:
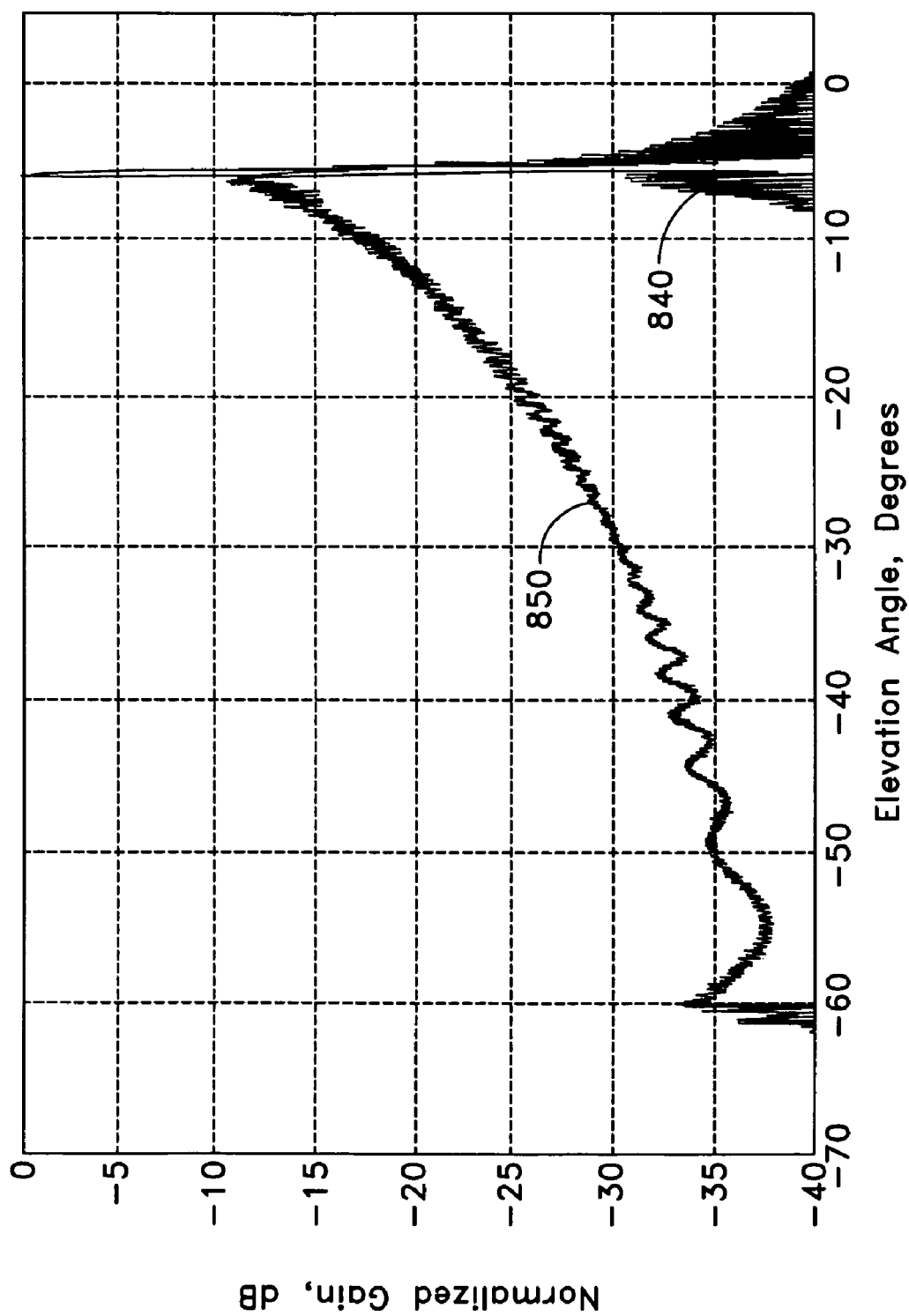
FIG. 11 is a graphical comparison of receive beams with & without amplitude and phase shaping of the present invention.

FIG. 11 is a graphical comparison of receive beams in the elevation plane with and without amplitude and phase shaping of the present plotted against a normalized gain along the ordinate and elevation angles along the abscissa. The line 850 shows the shaped receive beam from the amplitude and phase weighted aperture, and the line 840 shows the receive beam from a 30 dB Taylor-weighted aperture steered to −5.09° elevation. The receive amplitude and phase tapers are chosen to complement the transmit phase taper such that constant SNR is maintained along the earth's surface from −5.09° to −60° elevation.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is expressly intended that all combinations of those elements that perform substantially the same function in substantially the same way to achieve the same results are within the scope of the invention. Substitutions of elements from one described embodiment to another are also fully intended and contemplated.

We claim:

1. A radar antenna array comprising: a cylinder having thereon a plurality of rows of panels, wherein each panel is an electronically scanned antenna array that independently forms, steers, transmits and receives electromagnetic beams, and wherein each of the plurality of rows of panels comprises inactive panels and at least one set of selected active panels configured to be staggered relative to a selected set of active panels in an adjacent row.

2. The radar antenna array of claim 1, wherein the cylinder is a right circular cylinder.

3. The radar antenna array of claim 1, wherein the panels are rectangular.

4. The radar antenna array of claim 1, wherein the panels are flat and joined along vertical edges.

5. The radar antenna array of claim 2, wherein the panels are tangent to the right circular cylinder, such that the panels form a right polygonal cylinder having M panels along the circumference of the cylinder and N horizontal panels along the axis of the cylinder.

6. The radar antenna array of claim 1, further including a signal switching distribution network that allows transmit power and control signals to be sent to selected subsets of the panels.

7. The radar antenna array of claim 1, further including a signal switching distribution network that allows the incoming radar signal returns to be received as outputs from selected subsets of the panels.

8. The radar antenna array of claim 7, wherein a processor combines the outputs of the selected subsets of the panels to provide an output signal indicative of the radar coverage area.

9. The radar antenna array of claim 1, wherein the panels form an active aperture that focuses in one or more angular azimuth directions without inertia.

10. The radar antenna array of claim 5, wherein each of the panels is further decomposed into flat rectangular panels joined along the horizontal edges wherein each panel includes a plurality of antenna elements positioned in one of rectangular, triangular or hexagonal tessellation of the plane.

11. The radar antenna array of claim 1, wherein each panel contains a beamforming network that electronically forms and steers the electromagnetic beam for purposes of transmission and reception.

12. The radar antenna array of claim 1, wherein the panels operate as autonomous radars, which when electronically combined form multiple antenna apertures, each capable of operating autonomously.

13. A radar antenna array comprising: a plurality of antenna elements affixed in adjacent parallel rows to a cylindrical surface to emit and receive electromagnetic signals in forming multiple electromagnetic beams, each of said plurality of antenna elements being adapted to operate as a corresponding autonomous electronically scanned radar, wherein each radar element is capable of independently forming, steering, and shaping transmit and receive beams, and wherein each of the plurality of rows of said antenna elements comprises inactive panels and at least one set of selected active antenna elements configured to be staggered relative to a selected set of active antenna elements in an adjacent row.

14. The radar antenna array of claim 13, wherein said antenna array has an electromagnetic radiation field of view relative to a longitudinal axis.

15. The radar antenna array of claim 13, wherein said antenna array has an electromagnetic radiation field of view of plus or minus 60 degrees relative to a longitudinal axis.

16. The radar antenna array of claim 13, wherein said array is affixed to a non-planar mounting structure providing instantaneous scan capability over a full 360° azimuth without at least one of inertia and scan loss.

17. The radar antenna array of claim 13, wherein the array is mounted to an airship.

18. The radar antenna array of claim 17, wherein the array is independent of the surface of the airship to which it is mounted.

19. A radar antenna comprising: a polygonal cylindrically shaped active aperture that focuses in one or more angular azimuthal directions and includes a beamformer and a plurality of transmit-receive panels wherein each panel has a corresponding set of transmit-receive modules having phase shifters with amplitude control to generate multiple independent and simultaneous beams distributed to one or more associated transmit-receive panels of the set of panels, wherein the panels having corresponding sets of transmit-receive modules having phase shifters with amplitude control are electronically combined in subsets to form multiple radars, and wherein the multiple radars have multiple staggered rows, which serve as multiple independent radars.

20. The antenna array of claim 19, wherein the radar antenna is operative in a receive mode, and wherein the transmit-receive modules are synchronized to previous transmissions.

21. The antenna array of claim 19, wherein the radar antenna is operative in a transmit mode, and wherein multiple simultaneous transmissions emanate from separate panels on the cylinder.

22. The antenna array of claim 19, wherein an amplitude taper across the elements of each panel are variably controlled.

23. The antenna array of claim 19, wherein the element amplitude control maintains low sidelobes on transmit and receive.

24. The antenna array of claim 19, wherein the beamformer includes phase spoiling to broaden the radar transmit beams in azimuth.

25. The antenna array of claim 19, wherein each transmit beam includes multiple simultaneous and narrow receive beams to provide increased target dwell time.

26. The antenna array of claim 19, wherein each panel is operative as an independent sub-radar.

27. The antenna array of claim 19, wherein each individual panel transmit-receive module has a corresponding transmit-receive element.

28. The antenna array of claim 19, wherein the multiple radars are coherently combined to form one or more single pencil-beam radars.

29. The antenna array of claim 19, wherein the array includes a non-linear phase progression across selected panels on transmit and complex amplitude and phase weighting across selected panels on receive to shape the two-way beam gain in elevation.

30. The antenna array of claim 19, wherein the beamformer produces a constant signal-to-noise ratio against a reference surface target at a fixed azimuth for a target range from the horizon into a pre-determined minimum range.

31. The antenna array of claim 19, wherein multiple simultaneous receive beams, each with identical elevation shape and each steered to a different azimuth fill the transmit beam.

32. The antenna array of claim 19, wherein each simultaneous beam has a substantially equivalent and constant signal-to-noise ratio.

33. The antenna array of claim 19, wherein the panel electromagnetic near-field radiation pattern of the antenna is a projection of the panel shape in a direction perpendicular to the plane of the panel.

34. The antenna array of claim 19, wherein the panel electromagnetic far-field radiation phase front is substantially planar and subtends an angle with respect to the antenna array face as a function of the beam steering direction.

35. The antenna array of claim 19, wherein the panels are arranged as adjacent staves in a square matrix around the circumference of the cylinder.

36. The antenna array of claim 19, wherein an electronic system adjusts the amplitude and phase of each panel element independently.

37. The antenna array of claim 19, further comprising including an analog system, a plurality of panel manifolds that feed and receive signals of the transmit-receive module, a plurality of wave form generators, a plurality of up conversion processors that feed the panel manifolds, and a plurality of receiver and digital demodulators that receive signals from the panel manifolds.

38. The antenna array of claim 37, wherein the panel manifolds receive amplified element signals and feed the signals to the plurality of receiver and digital demodulators.

39. The antenna array of claim 37, wherein the panel manifolds distribute element signals on transmit and coherently combine element signals on receive.

40. The antenna array of claim 37, further including a digital system comprising a digital fiber link that feeds the plurality of wave form generators and an up converter that receives the plurality of receiver and digital demodulators return signals.

41. The antenna array of claim 40, wherein the demodulators within the receiver and digital demodulators receive radar return signals and produce a demodulated radar signal.

42. The antenna array of claim 40, wherein the receivers, demodulators and associated beamforming networks combine the panel elements to amplify the beamformer output and associated downconverters into digitized in-phase and quadrature-phase signals for signal processing.

43. The antenna array of claim 40, wherein a panel selector and distributor each feeds and receives transmission signals from the fiber link.

44. The antenna array of claim 43, wherein the fiber link receives analog signals and converts the analog signal to digital signals so as the panel selector and distributor receives radar return signals from the fiber link for signal processing.

45. The antenna array of claim 43, wherein the panel selector and distributor each receive input data from a radar controller to select certain of the panels for operation as a group.

46. A radar antenna array comprising: a right regular polygonal cylinder having multiple generally flat rectangular columnar stave panels and row panels, each capable of operating as an autonomous electronically scanned radar, and each capable of independently forming, steering, and shaping transmit and receive beams, having selective sets of active staves whereby signals and power are sent to various subsets of staves to form one or more active radar and wherein each of the plurality of rows of panels comprises inactive panels and at least one set of selected active panels configured to be staggered relative to a selected set of active panels in an adjacent row.

47. The antenna array of claim 46, wherein a subset of staves whose average normal is closest in azimuth to the desired beam azimuth are electronically identified.

48. The antenna array of claim 46, wherein the staves whose individual statistical normals deviate from the desired azimuth direction by more than a pre-selected threshold angle are electronically excluded from processing.

49. The antenna array of claim 46, further comprising a panel selector in combination with a panel-level multi-radar to configure the selected staves as a radar having outputs that are coherently combined.

50. The antenna array of claim 46, wherein phase progressions are applied to the stave and row panels to electronically steer the net beam to the desired angle.

51. The antenna array of claim 46, wherein electronic steering is less than 180/M degrees, where M is the number of staves.

52. The antenna array of claim 46, wherein the antenna is mounted in an airship, such that as the airship rotates, the selected set of staves moves about the polygonal cylinder to maintain its near-normal orientation with respect to the desired beam direction.

53. The antenna array of claim 52, wherein the radar beam probes a given earth-fixed azimuth independent of the airship orientation.

54. The antenna array of claim 46, wherein selected panel sets of staggered active panels and inactive panels has M staves and N panels per stave.

55. The antenna array of claim 46, wherein the selected sets of panel transmit aperture are uniformly weighted in amplitude and the receive aperture of weights are applied to each stave.

56. A process comprising: forming a plurality of electromagnetic beams for transmission from a subset of a plurality of antenna elements affixed in parallel rows to a cylindrical surface wherein the subset of antenna elements are selected in such a way that each of the plurality of rows of antenna elements comprises inactive panels and at least one set of selected active panels configured to be staggered relative to a selected set of active panels in an adjacent row; receiving electromagnetic energy associated with the plurality of beams at a plurality of antenna elements affixed in parallel rows to a cylindrical surface; setting one or more phase and gain control devices associated with each antenna element; combining multiple signals received from the antenna elements; and generating control signals to drive the phase and gain control devices to create the beams.

57. The process of claim 56, wherein, the step of combining multiple signals comprises the steps of: computing an in-phase component for the control signal for each antenna element comprising a sum of in-phase beam components for the corresponding antenna element; computing a quadrature component for the control signal for each antenna element comprising a sum of quadrature beam components for the corresponding antenna element; and computing a total gain and a total phase shift for each antenna element from the corresponding in-phase and quadrature components.

58. The process of claim 56, wherein the in-phase beam components for each antenna element include an in-phase component corresponding to each beam; and the quadrature beam components for each antenna element include a quadrature component corresponding to each beam.

59. The process of claim 56, wherein forming beams further comprises steering, and shaping transmit and receive beams.

* * * * *